US012385447B2

(12) United States Patent
Arumugam

(10) Patent No.: US 12,385,447 B2
(45) Date of Patent: Aug. 12, 2025

(54) LUBRICATION SYSTEM FOR A PIN JOINT OF AN ENGINE PISTON, AN ENGINE PISTON, AND A METHOD OF LUBRICATING A PIN JOINT OF AN ENGINE PISTON

(71) Applicant: Cummins Inc., Columbus, IN (US)

(72) Inventor: Raghuvaran Arumugam, Daventry (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/535,887

(22) Filed: Dec. 11, 2023

(65) Prior Publication Data

US 2024/0271586 A1 Aug. 15, 2024

Related U.S. Application Data

(60) Provisional application No. 63/445,112, filed on Feb. 13, 2023.

(51) Int. Cl.
*F02F 3/22* (2006.01)
*F01M 1/08* (2006.01)
(Continued)

(52) U.S. Cl.
CPC ................. *F02F 3/22* (2013.01); *F01M 1/08* (2013.01); *F01M 1/16* (2013.01); *F01P 3/10* (2013.01); *F01M 2001/086* (2013.01)

(58) Field of Classification Search
CPC ......... F02F 3/22; F01P 3/10; F16J 1/08; F16J 1/16; F01M 1/08; F01M 2001/086; F01M 2011/025
See application file for complete search history.

(56) References Cited

U.S. PATENT DOCUMENTS 1,763,625 A * 6/1930 Mellor .................. F02F 3/0015 123/41.38
1,856,107 A * 5/1932 Mellor ....................... F16J 1/22 123/41.38

(Continued)

FOREIGN PATENT DOCUMENTS

CN 110145406 A * 8/2019 ................ F02F 3/22
DE 23 18 113 A1 3/1974

(Continued)

OTHER PUBLICATIONS

European Search Report for EP Application No. 23216047, dated May 17, 2024, 2 pgs.

(Continued)

*Primary Examiner* — John M Zaleskas
(74) *Attorney, Agent, or Firm* — Foley & Lardner LLP

(57) ABSTRACT

Systems and apparatuses include a lubrication system having an engine piston defining a gudgeon pin aperture, a piston pooling cavity extending radially outward from the gudgeon pin aperture, a piston cooling gallery, and a piston lubrication passage. The piston lubrication passage is in fluid communication with the piston cooling gallery and the piston pooling cavity. The piston further includes a pin journal received in the gudgeon pin aperture of the engine piston and defining a journal aperture in fluid communication with the piston pooling cavity and a journal pooling cavity in fluid communication with the journal aperture. A gudgeon pin is received within the gudgeon pin aperture adjacent the pin journal, which provides fluid communication between the journal pooling cavity and the gudgeon pin.

19 Claims, 13 Drawing Sheets

(51) Int. Cl.
*F01M 1/16* (2006.01)
*F01P 3/10* (2006.01)

(56) References Cited

U.S. PATENT DOCUMENTS

| | | | | | |
|---|---|---|---|---|---|
| 1,959,279 | A * | 5/1934 | Stearns | F16C 9/04 | 92/187 |
| 2,442,408 | A * | 6/1948 | Bradley | F02F 3/22 | 123/41.38 |
| 2,523,699 | A * | 9/1950 | Holt | F02F 3/22 | 74/579 E |
| 2,625,448 | A * | 1/1953 | Underwood | F16C 33/1065 | 384/291 |
| 2,742,883 | A | 4/1956 | Smith | | |
| 3,204,617 | A * | 9/1965 | Hulbert | F01P 3/10 | 123/41.38 |
| 3,480,113 | A * | 11/1969 | Appleby | F16J 1/08 | 184/14 |
| 3,613,521 | A * | 10/1971 | Itano | F02F 3/003 | 29/888.044 |
| 3,783,747 | A * | 1/1974 | Alford | F16J 1/08 | 92/160 |
| 3,930,472 | A * | 1/1976 | Athenstaedt | F02F 3/003 | 123/41.38 |
| 4,005,686 | A * | 2/1977 | Wizemann | F01P 1/04 | 123/41.38 |
| 4,013,057 | A * | 3/1977 | Guenther | F16C 5/00 | 123/193.6 |
| 4,253,430 | A * | 3/1981 | Garter | F02B 77/11 | 123/41.38 |
| 4,270,494 | A * | 6/1981 | Garter | F02F 3/003 | 123/41.38 |
| 4,363,293 | A * | 12/1982 | Munoz | F02F 3/225 | 123/41.38 |
| 4,662,319 | A * | 5/1987 | Ayoul | F02F 3/003 | 123/41.38 |
| 6,334,385 | B1 * | 1/2002 | Wilksch | F02F 3/22 | 92/186 |
| 6,513,477 | B1 * | 2/2003 | Gaiser | F16J 1/08 | 123/193.6 |
| 9,038,593 | B1 | 5/2015 | Kessler et al. | | |
| 2001/0035139 | A1 * | 11/2001 | Lash | F02F 3/22 | 123/41.35 |
| 2003/0051694 | A1 * | 3/2003 | Gaiser | F02B 23/0672 | 123/193.6 |
| 2005/0047689 | A1 * | 3/2005 | Yamazaki | F16C 33/105 | 384/288 |
| 2006/0144351 | A1 * | 7/2006 | Fezer | F01M 5/025 | 123/41.35 |
| 2007/0095200 | A1 * | 5/2007 | Schroeder | F02F 3/00 | 92/187 |
| 2008/0250922 | A1 * | 10/2008 | Hayes | F01M 11/02 | 92/158 |
| 2010/0300396 | A1 * | 12/2010 | Issler | F16J 1/16 | 123/197.1 |
| 2010/0307444 | A1 * | 12/2010 | Bohm | F16J 1/16 | 123/193.6 |
| 2013/0068094 | A1 * | 3/2013 | Ribeiro | F16J 1/005 | 92/172 |
| 2014/0238360 | A1 * | 8/2014 | Dion | F16J 1/16 | 384/155 |
| 2015/0128920 | A1 * | 5/2015 | Kessler | F02B 75/28 | 123/61 R |
| 2015/0252715 | A1 * | 9/2015 | MacKenzie | F01M 1/06 | 123/41.42 |
| 2016/0222910 | A1 * | 8/2016 | Ribeiro | F02F 3/003 | |
| 2016/0356308 | A1 * | 12/2016 | Kessler | F16C 17/022 | |
| 2017/0074315 | A1 * | 3/2017 | Kessler | F16J 1/16 | |
| 2017/0167531 | A1 * | 6/2017 | Kessler | F02B 75/28 | |
| 2017/0298862 | A1 * | 10/2017 | Kimura | F01M 1/06 | |
| 2018/0202487 | A1 * | 7/2018 | Kessler | F16C 3/06 | |
| 2019/0186309 | A1 * | 6/2019 | Malischewski | F16C 7/023 | |
| 2019/0186312 | A1 * | 6/2019 | Malischewski | F01M 11/02 | |
| 2019/0218997 | A1 * | 7/2019 | Yang | F02F 3/22 | |

FOREIGN PATENT DOCUMENTS

| | | | | |
|---|---|---|---|---|
| DE | 23 48 870 | A1 | 4/1975 | |
| DE | 9108696 | U1 * | 10/1991 | |
| DE | 4439582 | A1 * | 5/1996 | F01M 1/06 |
| EP | 3 502 494 | A1 | 6/2019 | |
| GB | 2024987 | A * | 1/1980 | F02F 3/22 |
| JP | H08232624 | A * | 9/1996 | |
| JP | H09100745 | A * | 4/1997 | |
| JP | H09195847 | A * | 7/1997 | |
| JP | H11287154 | A * | 10/1999 | |
| KR | 20070060673 | A * | 6/2007 | |
| WO | WO-01/73275 | A1 | 10/2001 | |
| WO | WO-2018054524 | A1 * | 3/2018 | |
| WO | WO-2020053260 | A1 * | 3/2020 | F02F 3/22 |

OTHER PUBLICATIONS

Cesari, Henry. "Meet Ace; A 1,000-Horsepower Cummins Diesel Engine With Turbochargers, a Supercharger, and Only 4 Cylinders!" Motor Biscuit. Sep. 23, 2023. Retrieved from https://www.motorbiscuit.com/meet-ace-1000-horsepower-cummins-diesel-engine-with-turbochargers-supercharger-and-only-4-cylinders/ (accessed Dec. 11, 2023).

* cited by examiner

LUBRICATION SYSTEM FOR A PIN JOINT OF AN ENGINE PISTON, AN ENGINE PISTON, AND A METHOD OF LUBRICATING A PIN JOINT OF AN ENGINE PISTON

CROSS-REFERENCE TO RELATED PATENT APPLICATIONS

The present application claims the benefit of and priority to U.S. Provisional Patent Application No. 63/445,112, filed Feb. 13, 2023, the entire contents of which are hereby incorporated by reference herein.

STATEMENT REGARDING FEDERALLY SPONSORED RESEARCH OR DEVELOPMENT

This invention was made with Government support under Agreement No. W56HZV-21-9-C001, awarded by the U.S. Army Contracting Command. The Government has certain rights in the invention.

BACKGROUND

The present disclosure relates generally to lubrication systems for use with pin joints of an engine system. More specifically, the present disclosure relates to lubrication systems for piston assemblies of opposed-piston compression ignition engines.

SUMMARY

One embodiment relates to a lubrication system that includes an engine piston defining a gudgeon pin aperture, a piston pooling cavity extending radially outward from the gudgeon pin aperture, a piston cooling gallery, and a piston lubrication passage in fluid communication with the piston cooling gallery and the piston pooling cavity; a pin journal received in the gudgeon pin aperture of the engine piston and defining a journal aperture in fluid communication with the piston pooling cavity, and a journal pooling cavity in fluid communication with the journal aperture; and a gudgeon pin received within the gudgeon pin aperture adjacent the pin journal to provide fluid communication between the journal pooling cavity and the gudgeon pin.

In some embodiments, a piston cooling nozzle is configured to provide lubricant to the piston cooling gallery.

In some embodiments, the piston pooling cavity defines a convex profile in cross-section.

In some embodiments, the piston pooling cavity extends along a wrist axis defined by the gudgeon pin aperture.

In some embodiments, the engine piston includes a plurality of piston lubrication passages, and the plurality of piston lubrication passages provide fluid communication between the piston cooling gallery and the piston pooling cavity.

In some embodiments, the piston pooling cavity defines a volume that is larger than a volume defined by the plurality of piston lubrication passages.

In some embodiments, the gudgeon pin defines a pin bore that is in fluid communication with the journal pooling cavity. In such embodiments, the lubrication system can further include a connecting rod defining a rod bore therethrough. The connecting rod can be fluidly coupled to the pin bore by a check valve.

Another embodiment relates to an engine piston including a piston body. The piston body defines a gudgeon pin aperture, a piston pooling cavity, a piston cooling gallery, and a piston lubrication passage. The piston pooling cavity extends radially outward from the gudgeon pin aperture and defines a channel that extends parallel to a wrist axis defined by the gudgeon pin aperture. The piston cooling gallery extends in a circumferential direction about a piston axis of the piston body. The piston lubrication passage extends between the piston cooling gallery and the piston pooling cavity.

In some embodiments, the piston lubrication passage extends radially away from the piston pooling cavity.

In some embodiments, the piston lubrication passage extends from an end of the piston pooling cavity proximate to a circumferential edge of the piston pooling cavity.

In some embodiments, the piston lubrication passage extends axially away from the piston cooling gallery relative to the piston axis.

In some embodiments, the piston pooling cavity is a semi-circular groove having a constant radius of curvature that extends between two circumferential positions along the gudgeon pin aperture.

In some embodiments, the piston lubrication passage is one of a plurality of piston lubrication passages that extend from the piston cooling gallery toward the wrist axis.

In some embodiments, the piston pooling cavity is one of a plurality of piston cooling cavities disposed at different circumferential positions along the gudgeon pin aperture.

In some embodiments, the piston pooling cavity is spaced axially apart from opposing axial ends of the gudgeon pin aperture relative to the wrist axis.

Yet another embodiment relates to a method of lubricating a pin joint of an engine piston. The method includes receiving, by a piston cooling gallery of the engine piston, a lubricant. The method also includes providing, by a piston lubrication passage of the engine piston that extends from the piston cooling gallery, the lubricant to a piston pooling cavity of the engine piston that extends radially away from a gudgeon pin aperture of the engine piston.

In some embodiments, the method further includes providing the lubricant to a gudgeon pin disposed within the gudgeon pin aperture by passing the lubricant through a journal lubrication aperture of a journal disposed within the gudgeon pin aperture.

In some embodiments, providing the lubricant to the gudgeon pin further includes distributing the lubricant across a journal pooling cavity in fluid communication with the journal lubrication aperture and extending radially away from a journal aperture that is coaxial with a wrist axis of the gudgeon pin.

In some embodiments, the method includes providing the lubricant to the gudgeon pin through a connecting rod that is coupled to the gudgeon pin by passing the lubricant through a check valve that is positioned in a feed bore of the gudgeon pin.

This summary is illustrative only and is not intended to be in any way limiting. Other aspects, inventive features, and advantages of the devices and/or processes described herein will become apparent in the detailed description set forth herein, taken in conjunction with the accompanying figures, wherein like reference numerals refer to like elements.

DETAILED DESCRIPTION

Figure 1:
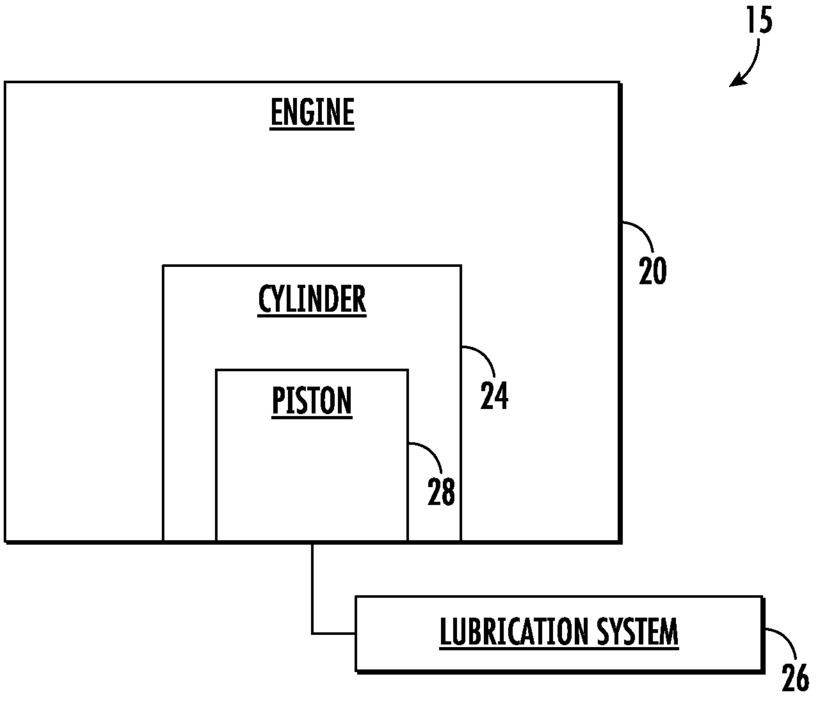
FIG. 1 is a schematic diagram of an engine system including a lubrication system for a pin joint of an engine piston, according to some embodiments.

Following below are more detailed descriptions of various concepts related to, and implementations of a lubrication system for a pin joint of an engine piston, an engine piston, and a method of lubricating a pin joint of an engine piston. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems, apparatuses, and methods for lubricating a pin joint of an engine piston, such as a piston of a horizontal, opposed-piston engine. The lubrication system can provide lubricant to a wrist pin joint (e.g., a gudgeon pin joint, etc.) of the piston that is used to connect the piston to a connecting rod of an engine. The lubrication system includes the engine piston that defines a gudgeon pin aperture, a piston pooling cavity extending radially outward from the gudgeon pin aperture, a piston cooling gallery, and a piston lubrication passage in fluid communication between the piston cooling gallery and the piston pooling cavity. The piston pooling cavity holds a volume of lubricant that can be greater than the volume stored in a nominal lubricant passageway used in typical horizontal, opposed-piston engines.

The piston pooling cavity is positioned adjacent the gudgeon pin aperture for quick delivery of lubricant thereto. A pin journal is received within the gudgeon pin aperture and defines a journal aperture in fluid communication with the piston pooling cavity, and a journal pooling cavity in fluid communication with the journal aperture. As noted above, the journal pooling cavity holds a volume of lubricant that is larger than that in a typical lubricant passageway and provides fast delivery of lubricant to the journal aperture.

In some embodiments, a gudgeon pin is received within the journal aperture so that fluid communication is provided between the journal pooling cavity and the gudgeon pin. In some embodiments, the gudgeon pin also includes internal lubricant passageways that provide lubricant to the pin journal. In some embodiments, the internal lubricant passageways include an accumulation chamber that holds a volume of lubricant. In some embodiments, at least one of the internal lubricant passageways includes a check valve configured to inhibit reverse flow of lubricant from the internal lubricant passageways.

Referring generally to FIGS. 1-5, an engine system 15 includes a lubrication system 26 that is configured to provide lubricant to a pin joint connecting an engine piston 28 to a connecting rod 88. The lubrication system 26 includes the engine piston 28, a pin journal 68, and a gudgeon pin 84. The engine piston 28 includes a piston body 30 (see FIGS. 2-5) defining a gudgeon pin aperture 32. The engine piston 28 also includes a piston pooling cavity 38 extending radially outward from the gudgeon pin aperture 32. The engine piston 28 further includes a piston cooling gallery 40 and a piston lubrication passage 44 in fluid communication with the piston cooling gallery 40 and the piston pooling cavity 38. The pin journal 68 is received in the gudgeon pin aperture 32 of the piston body 30 and defines a journal aperture 72 in fluid communication with the piston pooling cavity 38. The pin journal 68 also defines a journal pooling cavity 80 in fluid communication with the journal aperture 72. The gudgeon pin 84 is received within the gudgeon pin aperture 32 adjacent the pin journal 68 to provide fluid communication between the journal pooling cavity 80 and the gudgeon pin 84.

The engine system 15 includes an engine block 20 including a cylinder 24 and a piston 28 movable within the cylinder 24. In some embodiments, the engine system 15 is a two-stoke opposed piston engine. In some embodiments, the engine block 20 includes four cylinders 24 and eight pistons 28. In some embodiments, the engine system 15 is a compression ignition engine (e.g., a diesel engine). The engine system 15 further includes a lubrication system 26 that provides lubricant (e.g., an engine oil) to the piston 28. In some embodiments, the engine block 20 includes more than four or fewer than four cylinders 24 and more or fewer than eight pistons 28. In some embodiments, the engine system 15 is arranged with a single piston 28 arranged in each cylinder 24.

Figure 2:
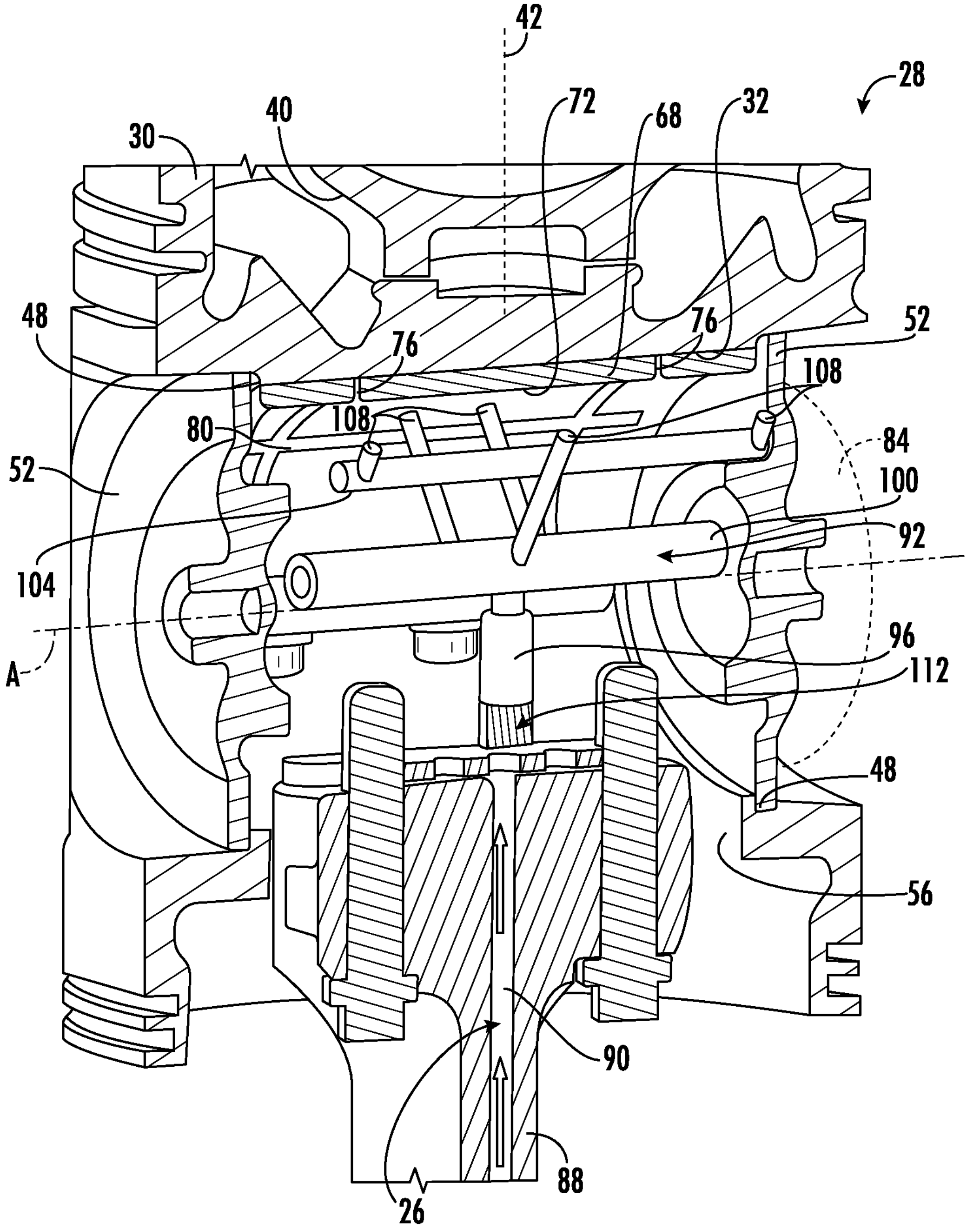
FIG. 2 is a front, right, top perspective section view of the lubrication system for the pin joint of the engine piston of FIG. 1, according to some embodiments.
Figure 3:
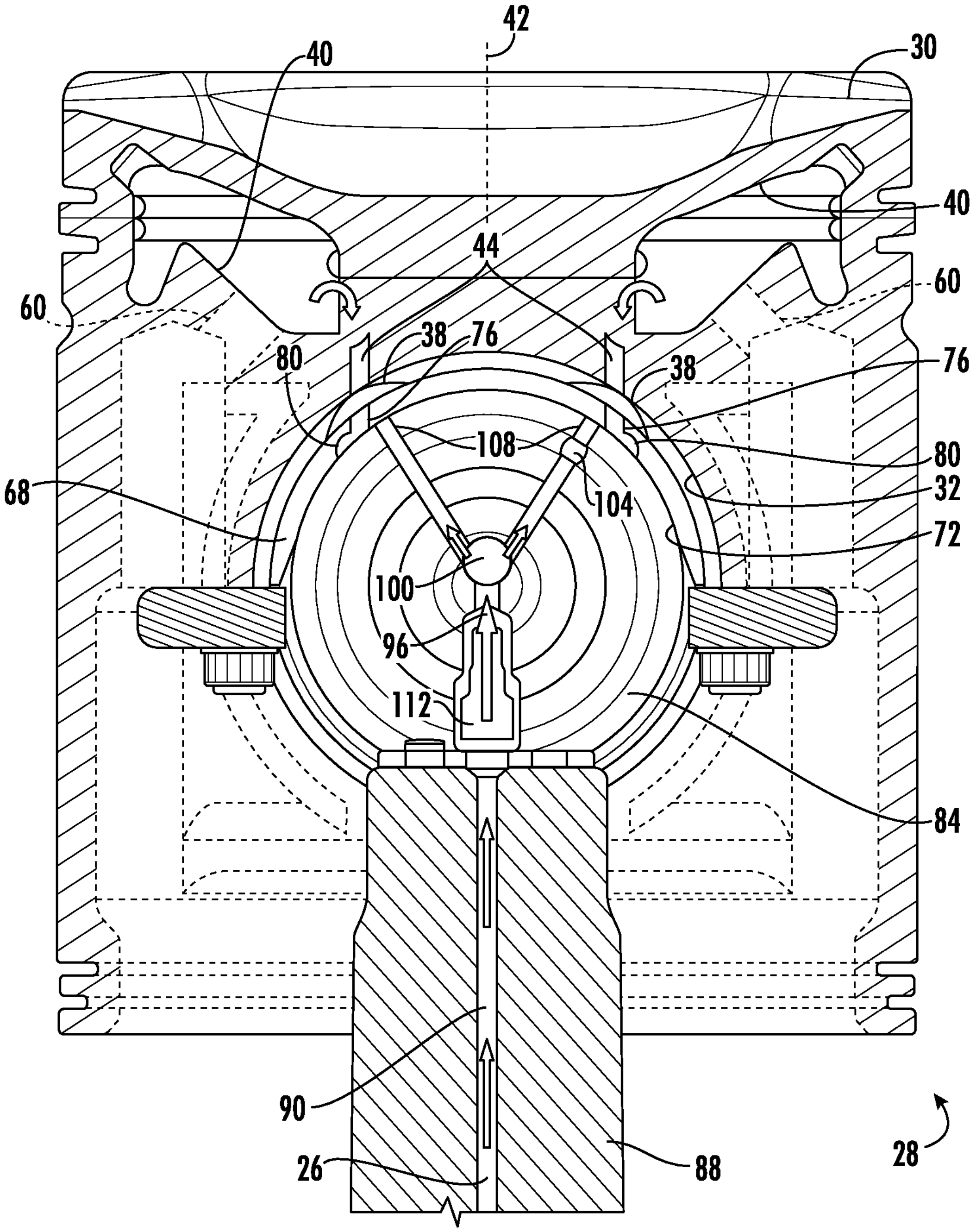
FIG. 3 is a right side section view of the lubrication system for the pin joint of the engine piston of FIG. 1, according to some embodiments.
Figure 4:
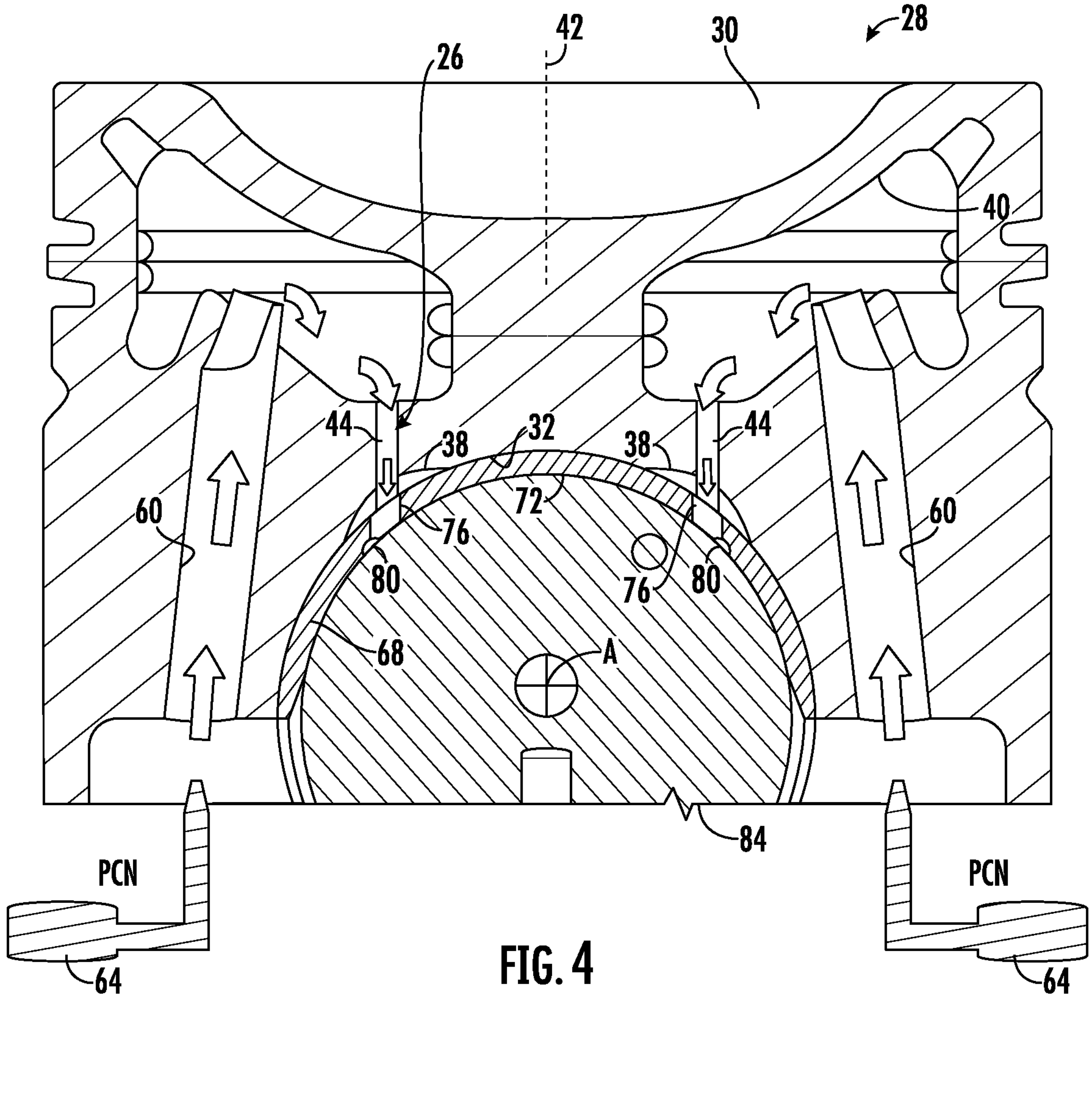
FIG. 4 is a right side section view of the lubrication system for the pin joint of the engine piston of FIG. 1, according to some embodiments.

Referring to FIGS. 2-4, the engine piston 28 includes a piston body 30. The piston body 30 defines a gudgeon pin aperture 32. The piston body 30 can also define a piston pooling cavity 38 extending radially outward from the gudgeon pin aperture 32 (see FIG. 3). In some embodiments, the piston pooling cavity 38 defines a channel 46 that extends parallel to a wrist axis A defined by the gudgeon pin aperture 32 (see FIG. 5). The piston body 30 can further define a piston cooling gallery 40 extending in a circumferential direction about a piston axis 42 of the piston body 30. In some embodiments, the piston body 30 further defines a piston lubrication passage 44 extending between the piston cooling gallery 40 and the piston pooling cavity 38 (see FIG. 3).

In some embodiments, the piston body 30 includes a piston crown and a piston skirt coupled to the piston crown and extending axially away from the piston crown. Together, the piston crown and the piston skirt define the piston cooling gallery 40 therebetween. The piston cooling gallery 40 extends in a circumferential direction relative to a piston axis 42 (e.g., a central axis) of the engine piston 28.

Figure 5:
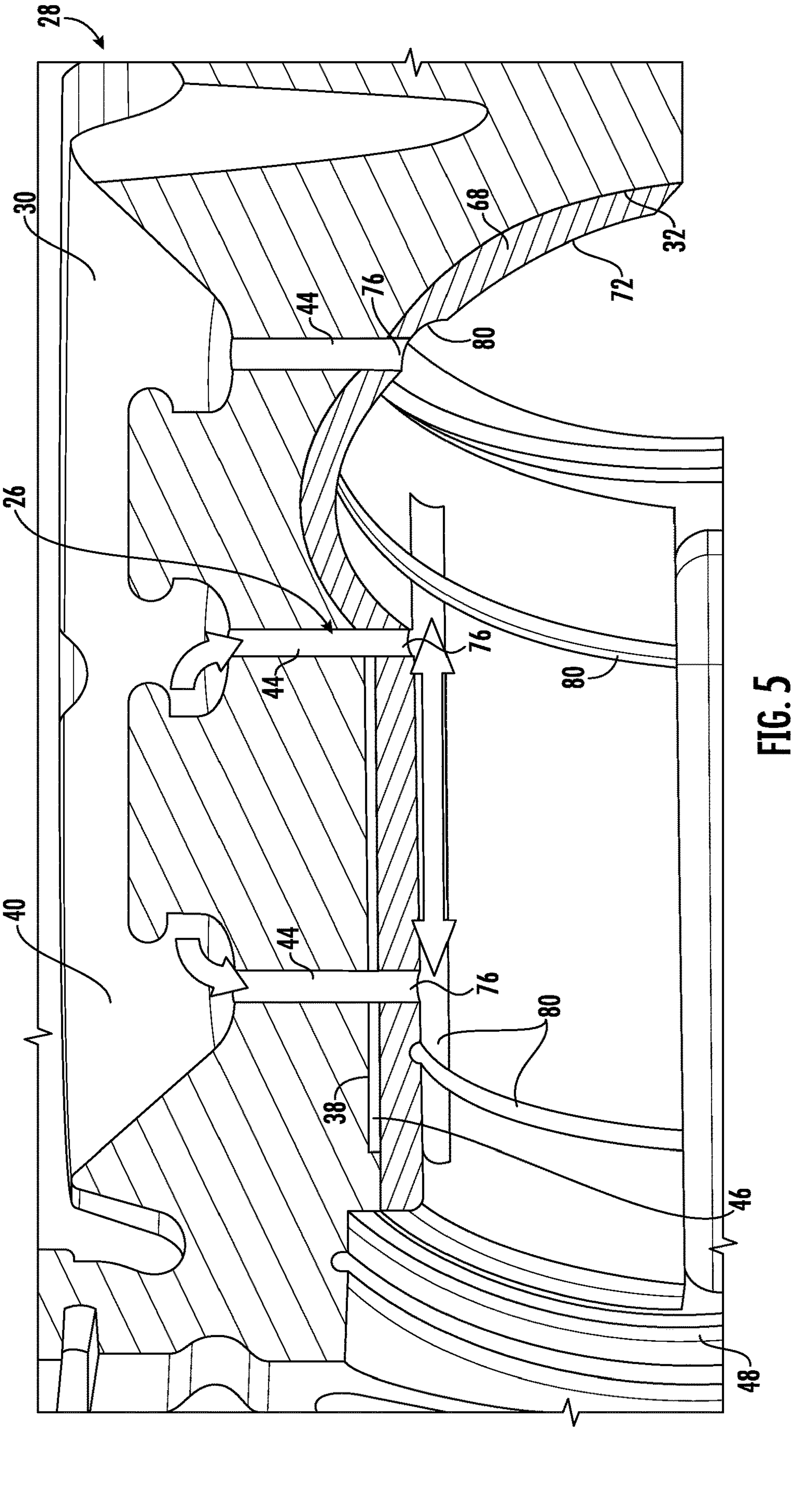
FIG. 5 is a section view of the engine piston of FIG. 1, according to some embodiments.

In some embodiments, the piston pooling cavity 38 is one of a plurality of piston pooling cavities 38 disposed at different circumferential positions along the gudgeon pin aperture 32. For example, as shown in FIG. 5, the piston 28 includes two piston pooling cavities 38 extending parallel to the wrist axis A. In some embodiments, the piston 28 includes more than two or fewer than two piston pooling cavities 38. In some embodiments, as shown in FIG. 5, the piston pooling cavity 38 is spaced axially apart from opposing axial ends of the gudgeon pin aperture 32 relative to the wrist axis A such that there is an axial gap between both axial ends of the gudgeon pin aperture 32 and the piston pooling cavity 38.

The piston lubrication passage 44 extends axially away from the piston cooling gallery 40 relative to the piston axis 42. In some embodiments, the piston lubrication passage 44 is one of a plurality of piston lubrication passages 44 that extend from the piston cooling gallery 40 toward the wrist axis A. In some embodiments, the piston 28 includes four piston lubrication passages 44 (see FIG. 5). First and second piston lubrication passages 44 are configured to feed a first piston pooling cavity 38. Third and fourth piston lubrication passages 44 are configured to feed a second piston pooling cavity 38. In some embodiments, the piston 28 includes fewer than four or more than four piston lubrication passages 44.

In some embodiments, the piston pooling cavity 38 is a semi-circular groove having a constant radius of curvature R that extends between two circumferential positions along the gudgeon pin aperture 32 (see FIG. 4). In some embodiments, at least one piston pooling cavity 38 defines a convex profile in cross section. The convex profile can extend parallel to the wrist axis A. For example, as shown in FIG. 3, the piston pooling cavities can be shaped as rounded protrusions extending from above journal lubrication apertures 76 when viewed from an axial direction. In other words, the piston pooling cavity 38 defines a scalloped shaped profile. In some embodiments, the piston pooling cavities 38 are semi-circular in cross section, rectangular in cross section, or define a different cross sectional profile. In some embodiments, the piston pooling cavity 38 extends along the wrist axis A defined by the gudgeon pin aperture 32. The gudgeon pin aperture 32 can extend coaxially with a wrist axis A.

In some embodiments, the engine piston 28 includes (e.g., the piston body 30 defines) a plurality of piston lubrication passages 44 and the plurality of piston lubrication passages 44 provide fluid communication between the piston cooling gallery 40 and the piston pooling cavity 38. As used herein, "provide fluid communication between," "in fluid communication with," and the like refers to regions, passages, channels, etc. that fluidly connect one element to another element so that fluid (e.g., lubricant) can flow therebetween. In some embodiments, the piston pooling cavity 38 defines a volume that is larger than a volume defined by the plurality of piston lubrication passages 44. The piston pooling cavities 38 can provide a faster response to a need for lubrication than systems that do not employ piston pooling cavities 38. In particular, the volume defined by the piston pooling cavity 38 can be larger than the collective volume of the sum of each internal volume of the plurality of piston lubrication passages 44.

The piston 28 includes shoulders 48 adjacent the gudgeon pin aperture 32 and structured to receive end caps 52. The piston 28 also includes a crank shaft aperture 56 and gallery feed passages 60 (see FIG. 3). The gallery feed passages 60 are configured to provide communication between at least one piston cooling nozzle 64 and the piston cooling gallery 40. In some embodiments, the piston cooling nozzle 64 is configured to provide lubricant to the piston cooling gallery 40. In some embodiments, only one piston cooling nozzle 64 provides lubricant to the piston cooling gallery 40. In other embodiments, the lubrication system includes multiple piston cooling nozzles 64 that provide lubricant to the piston cooling gallery 40 (e.g., through respective ones of a plurality of gallery feed passages 60). In some embodiments, the piston 28 includes two gallery feed passages 60. In some embodiments, the piston 28 includes more than two or one gallery feed passages 60.

In some embodiments, a journal 68 is received within the gudgeon pin aperture 32 and defines a journal aperture 72 coaxial with the wrist axis A. Two pairs of journal lubrication apertures 76 (see FIG. 3) provide communication between the piston pooling cavities 38 and the journal aperture 72. Each of the journal lubrication apertures 76 is aligned with one of the piston pooling cavities 38 to receive lubricant therefrom. In some embodiments, the journal 68 includes more than four or fewer than four journal lubrication apertures 76. The journal 68 further includes journal pooling cavities 80 in fluid communication with the journal lubrication apertures 76 and shaped to distribute lubricant within the journal aperture 72. In some embodiments, the journal pooling cavities 80 extend both axially parallel to the wrist axis A and radially about the wrist axis A.

A gudgeon pin 84 is received within the journal aperture 72 and maintained axially by engagement with a connecting rod 88. The gudgeon pin is supported within the journal aperture 72 and the gudgeon pin aperture 32 for rotation about the wrist axis A during operation of the engine system 15. The gudgeon pin 84 is coupled (e.g., fastened) to the connecting rod 88 through the crank shaft aperture 56. The gudgeon pin 84 includes a pin lubrication system 92 including a feed bore 96 structured to receive lubricant from the connecting rod 88. In some embodiments, the connecting rod 88 defines a rod bore 90 therethrough (see FIGS. 2-3) that supplies lubricant to an opposite side of the gudgeon pin 84 as the engine piston 28. The gudgeon pin 84 further defines a pin bore 100 that is in fluid communication with the journal pooling cavity 80. The pin bore 100 receives lubricant from the feed bore 96.

In some embodiments, the gudgeon pin 84 further includes one or more distribution bores 104 receiving lubricant from the pin bore 100. Additionally, journal feeds 108 can be provided that extend from either the pin bore 100 or the distribution bore 104 and provide lubricant to the interface of the gudgeon pin 84 and the journal 68. In some embodiments, the pin lubrication system 92 includes one distribution bore 104 and a plurality of journal feeds 108. For example, five journal feeds 108 can be provided. In some embodiments, the pin lubrication system 92 includes more than one distribution bore 104 or the distribution bore 104 is eliminated, and more than five or fewer than five journal feeds 108 can be provided.

In some embodiments, the connecting rod 88 (e.g., the rod bore 90) is fluidly coupled to the pin bore 100 by a check valve 112. In some embodiments, a check valve 112 is positioned in the feed bore 96 to inhibit flow of lubricant from the gudgeon pin 84 to the connecting rod 88. In some embodiments, reversal of lubricant flow can occur because of inertial effects. When the piston 28 moves from outer dead center to inner dead center, the lubricant column in the connecting rod 88 tries to flow back (i.e., downward in FIGS. 2 and 3, opposite the arrows). Flow reversal affects the flowrate of lubricant to the pin joint in a way that can impede sufficient supply of lubricant. In particular, the effect is compounded more particularly in 2-stroke engines (e.g., the engine system 15) where the gudgeon pin 84 and the journal 68 do have little separation. In particular, a clearance can be provided between the gudgeon pin 84 and the journal 68. It is desirable to operate the pin joint on the piston 28 in a hydrodynamic lubrication regime and not in a mixed or boundary regime to inhibit scuffing and seizure. It is desirable to maintain a high and stable lubricant flowrate to the journal 68. The pin lubrication system 92 is designed to hold a certain amount of lubricant in the pin bore 100 and the journal feed 108 include precise drillings to feed lubricant to the journal 68 at a precise flowrate. The pin lubrication system 92 is maintained to operate at different engine speeds and loads while maintaining required flowrate at those conditions.

The pin joint system is also fed from piston cooling gallery 40 of the piston 28. The piston lubrication passages 44 helps in filling in the journal pooling cavities 80 which helps in pin joint lubrication and helps in effective draining from the piston cooling gallery 40, which improves a filling ratio and heat transfer from the piston 28.

The flow from the piston cooling gallery 40 to the journal 68 happens just momentarily after the piston cooling nozzles 64 deliver lubricant into the piston cooling gallery 40. When the piston 28 starts its movement from outer dead center to inner dead center, the inertia of the lubricant pushes it into the journal pooling cavities 80 through lubrication passages 44. As the biaxial gudgeon pin 84 rotates, a gap opens between the journal 68 and bearing running face of the gudgeon pin 84 which creates suction in the lubrication column. This mechanism replenishes the lubricant in the journal aperture 72. The piston lubrication passages 44 are sized to deliver a desired amount of lubricant from the piston cooling gallery 40 into the journal 68. When included, the check valve 112 restricts a flow of lubricant from the gudgeon pin aperture 32 into the connecting rod 88. As a result, pressure remains unaffected in the pin bore 100 which results in a steady stream of lubricant reaching the journal 68.

As shown in FIG. 5, the journal pooling cavities 80 extend both axially parallel to the wrist axis A and radially about the wrist axis A and receive lubricant from the four piston lubrication passages 44 via the piston pooling cavities 38.

Figure 6:
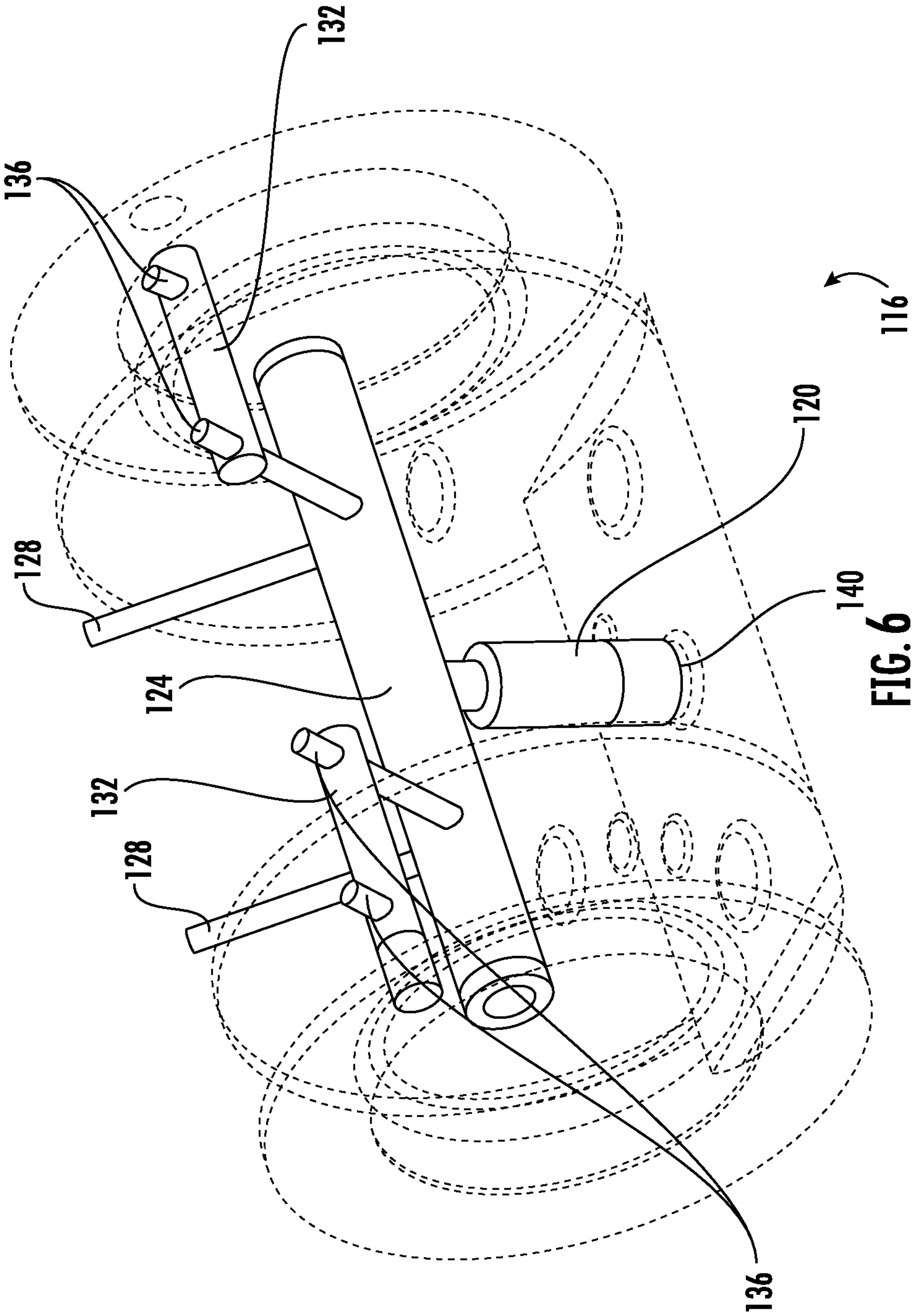
FIG. 6 is a perspective view of a gudgeon pin of the pin joint of FIG. 1, according to some embodiments.

As shown in FIG. 6, an alternative gudgeon pin 116 operates similarly to the gudgeon pin 84 discussed above. The gudgeon pin 116 includes a feed bore 120, a pin bore 124, two primary feed passageways 128 providing fluid flow between the pin bore 124 and an external surface of the gudgeon pin 116. The gudgeon pin 116 further includes two distribution bores 132, and four secondary feed passageways 136 (e.g., two pairs of secondary feed passageways 136) providing fluid flow between the distribution bores 132 and the external surface of the gudgeon pin 116. In some embodiments, more or fewer primary feed passageways 128 and secondary feed passageways 136 can be included. In some embodiments, a check valve 140 is included in the feed bore 120.

Figure 7:
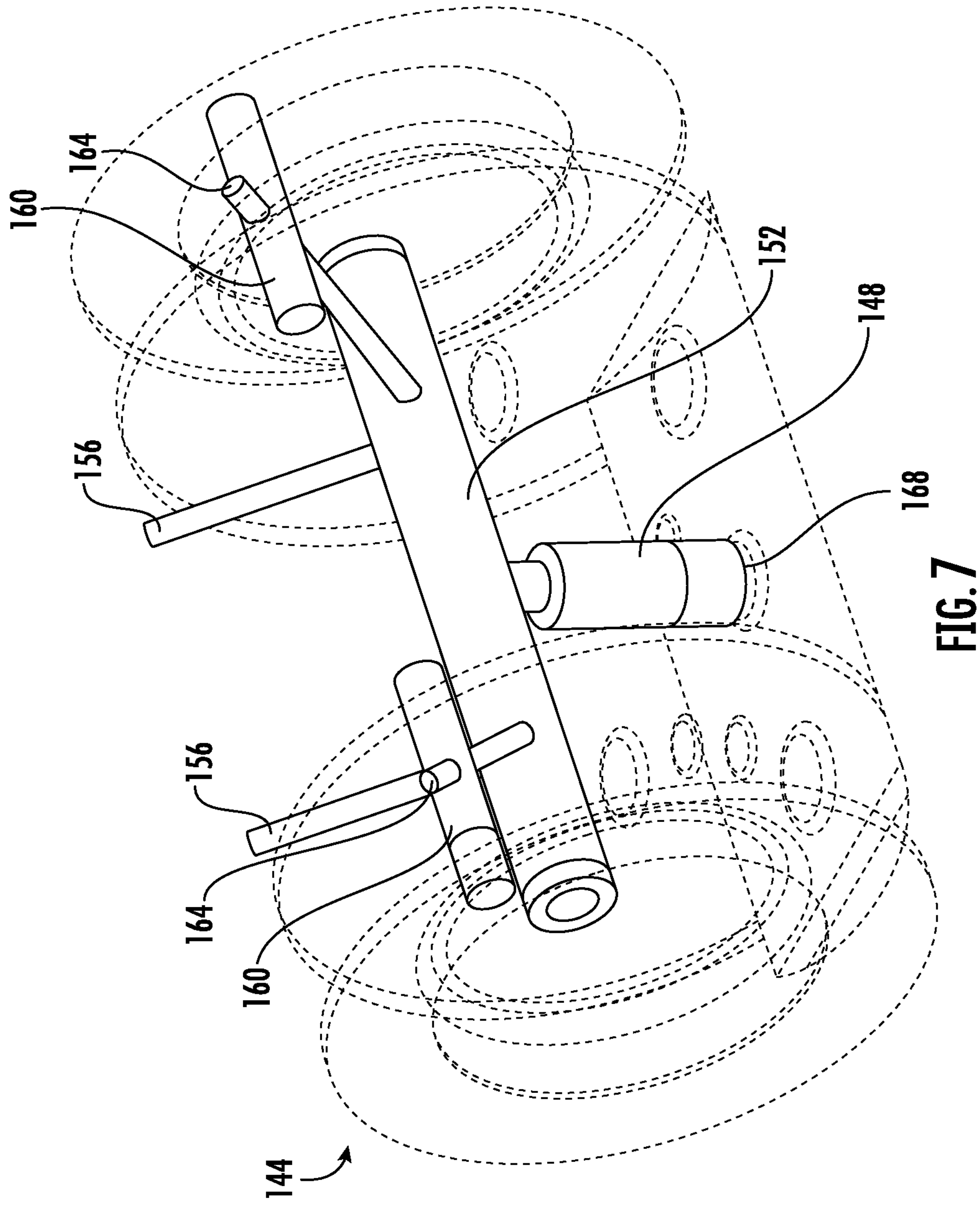
FIG. 7 is a perspective view of an alternative gudgeon pin of the pin joint of FIG. 1, according to some embodiments.

As shown in FIG. 7, an alternative gudgeon pin 144 operates similarly to the gudgeon pin 84 discussed above. The gudgeon pin 144 includes a feed bore 148, a pin bore 152, two primary feed passageways 156 providing fluid flow between the pin bore 152 and an external surface of the gudgeon pin 144, two distribution bores 160, and two secondary feed passageways 164. The two secondary feed passageways 164 providing fluid flow between the distribution bores 160 and the external surface of the gudgeon pin 144. In some embodiments, more or fewer primary feed passageways 156 and secondary feed passageways 164 can be included. In some embodiments, a check valve 168 is included in the feed bore 148 to inhibit reverse flow of lubricant.

Figure 8:
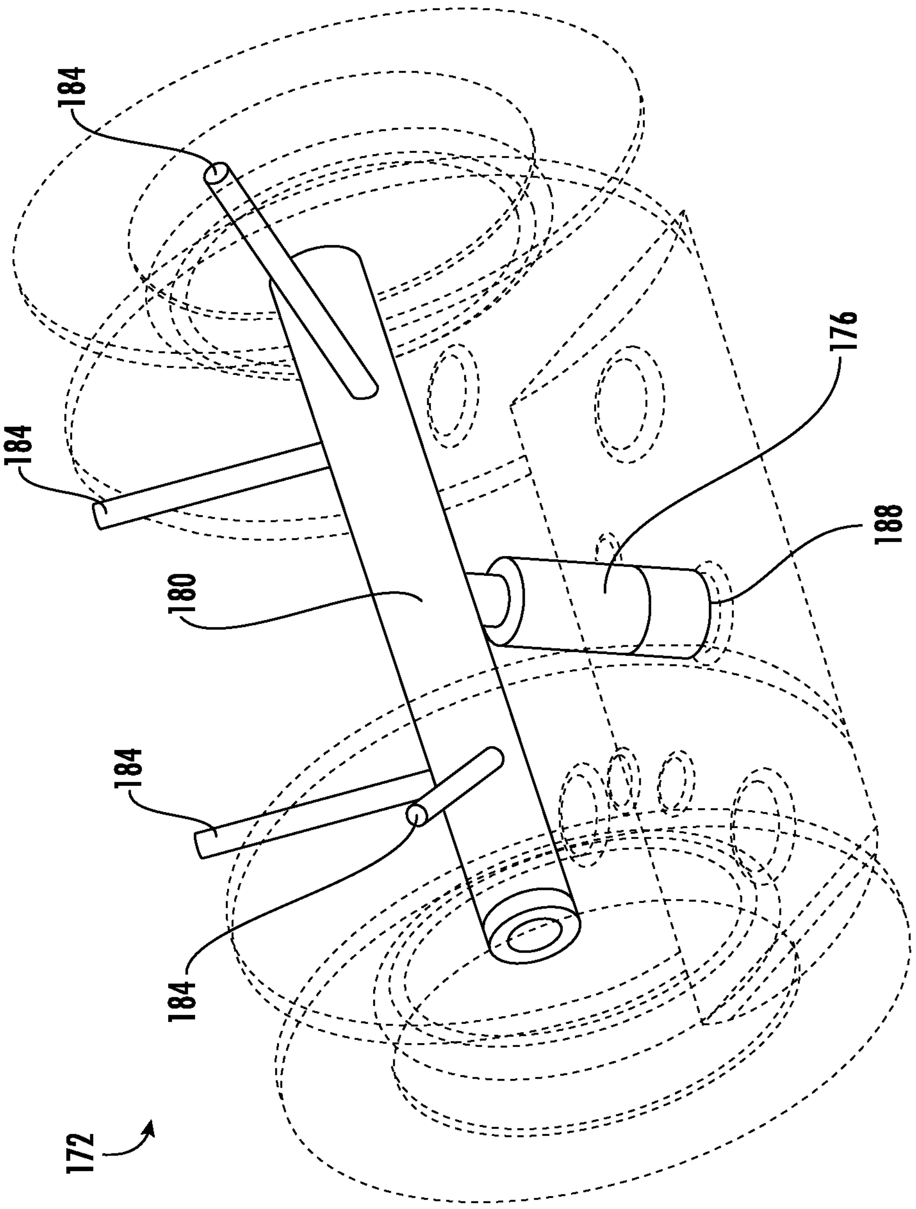
FIG. 8 is a perspective view of an alternative gudgeon pin of the pin joint of FIG. 1, according to some embodiments.

As shown in FIG. 8, an alternative gudgeon pin 172 operates similarly to the gudgeon pin 84 discussed above. The gudgeon pin 172 includes a feed bore 176, a pin bore 180, and a plurality of feed passageways 184. The feed passageways 184 are configured to provide fluid flow between the pin bore 180 and an external surface of the gudgeon pin 172. In some embodiments, more or fewer feed passageways 184 can be included. In some embodiments, a check valve 188 is included in the feed bore 176. The gudgeon pins 84, 116, 144, 172 discussed herein demonstrate alternative layouts that can be used to efficiently provide lubricant to the exterior surface of the gudgeon pin 84, 116, 144, 172 and lubricate the interface of the gudgeon pin 84, 116, 144, 172 and the journal 68.

Figure 9:
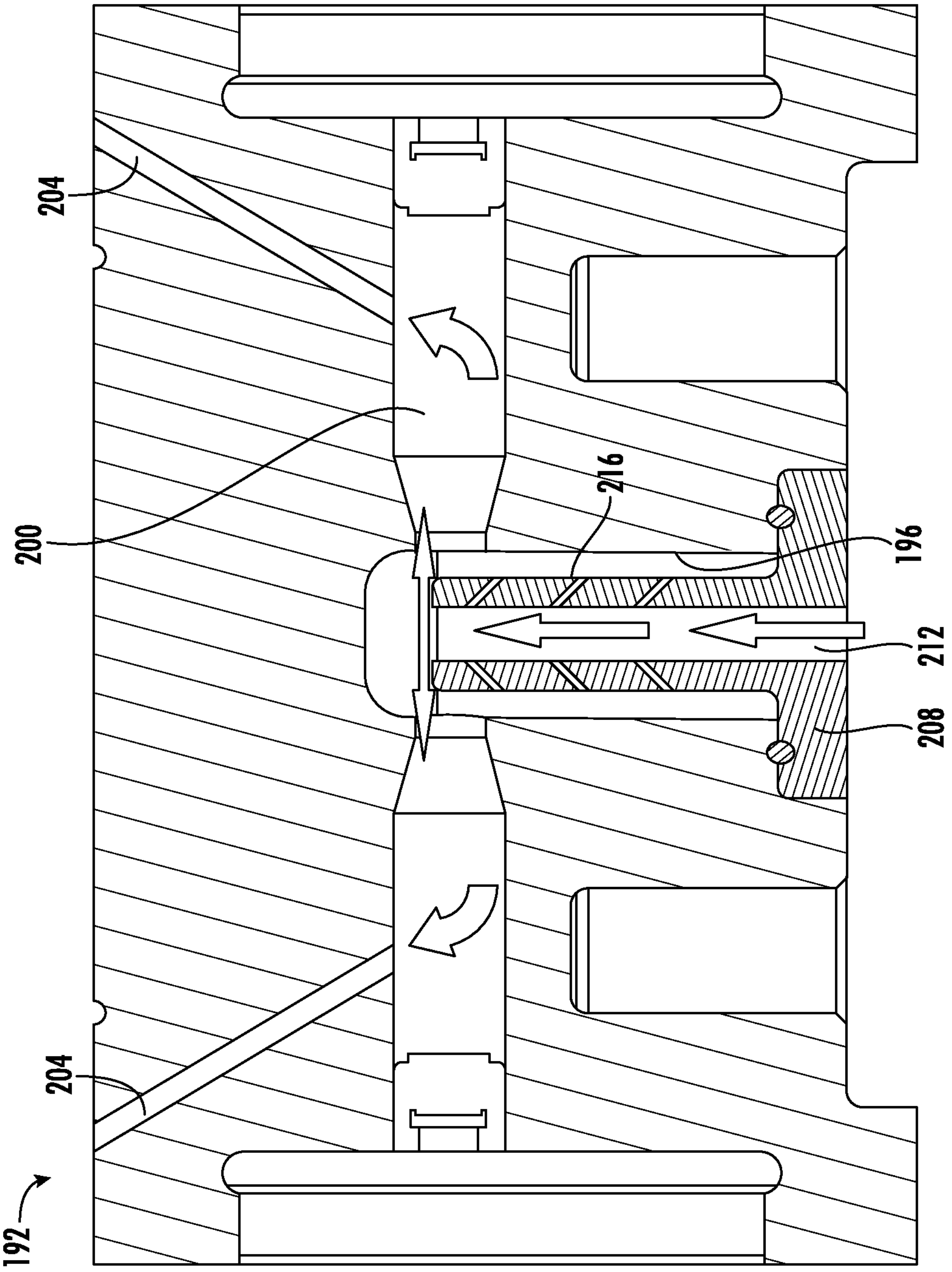
FIG. 9 is a section view of a gudgeon pin of the pin joint of FIG. 1, according to some embodiments.

As shown in FIG. 9, an alternative gudgeon pin 192 can include any of the lubricant layouts discussed above. The gudgeon pin 192 includes a feed bore 196, a pin bore 200, and feed passageways 204. A flow control device 208 is positioned within the feed bore 196 and includes a central aperture 212 and reflow apertures 216. In some embodiments, both of the central aperture 212 and the reflow apertures 216 are arranged in fluid communication with and at an oblique angle relative to the central aperture 212. The flow control device 208 allows free flow of lubricant into the feed bore 196. In some embodiments, minimal lubricant (sufficient to provide lubrication, without excess lubrication) can flow through the reflow apertures 216. When lubricant is caused to reverse flow (e.g., due to an inertial effect when the piston 28 moves from the outer dead center to inner dead center, the lubricant column in the rod 88 attempts to flow back), the reflow apertures 216 are structured to direct the lubricant back to into the feed bore 196 and the pin bore 200. In particular, the reflow apertures 216 are shaped in manner conducive to allow the lubricant to return to both of the feed bore 196 and the pin bore 200. Therefore, the flow control device 208 effectively replaces the check valves discussed above.

Figure 10:
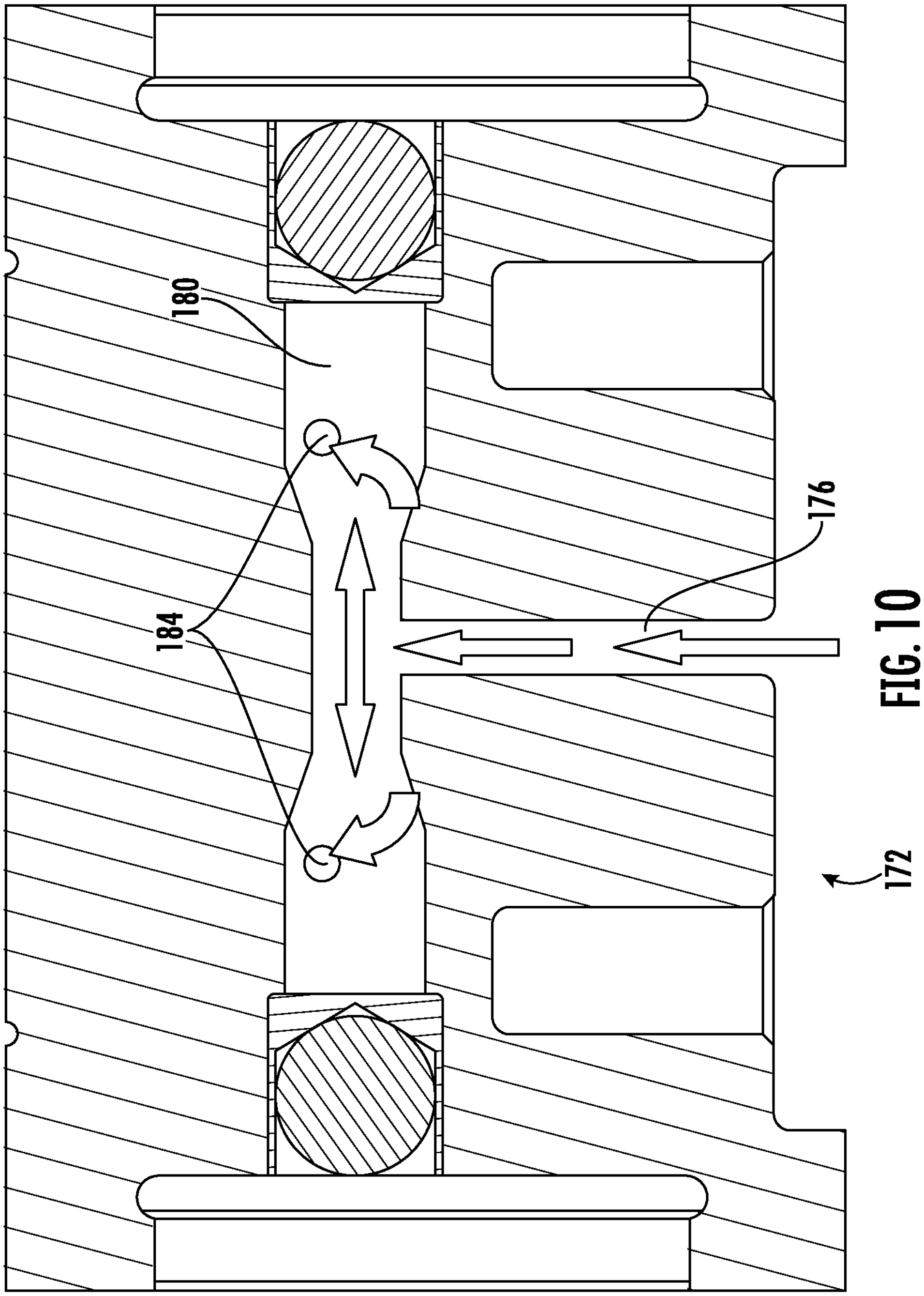
FIG. 10 is a section view of an alternative gudgeon pin of the pin joint of FIG. 1, according to some embodiments.

As shown in FIG. 10, a sectional view of the gudgeon pin 172 shows an embodiment where the check valve 188 is eliminated.

Embodiments of the lubrication system described with reference to FIGS. 1-10 of the present disclosure should not be considered limiting. Many alternatives and combinations are possible without departing from the inventive principles disclosed herein. For example, referring to FIGS. 11-13, arrangements of a pin joint lubrication system are shown that include a variety of different passage geometries for lubricant flow.

Figure 11:
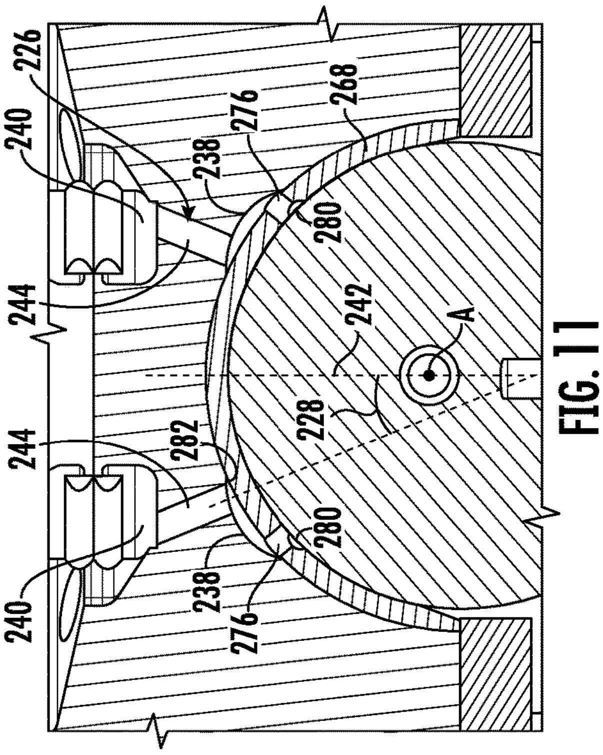
FIG. 11 is a section view of an alternative lubrication system for the pin joint of the engine piston of FIG. 1, according to some embodiments.
Figure 12:
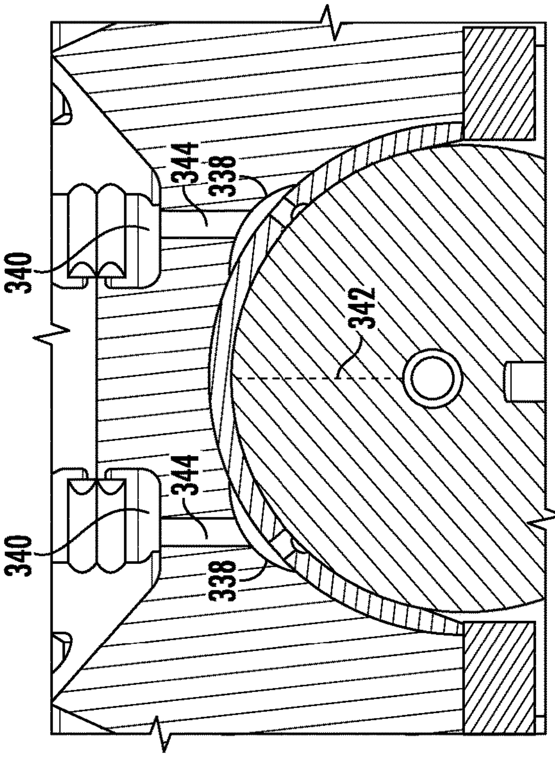
FIG. 12 is a section view of yet another lubrication system for the pin joint of the engine piston of FIG. 1, according to some embodiments.

For example, referring to FIG. 11, a lubrication system 226 is shown that includes a piston body 230 defining a piston lubrication passage 244 that extends at an oblique angle 228 relative to a piston axis 242 defined by the piston body 230 (e.g., a central axis of the piston body). In some embodiments, the piston lubrication passage 244 extends radially away from a piston pooling cavity 238. In the embodiment of FIG. 11, the piston lubrication passage 244 extend linearly (e.g, along a straight line) between the piston pooling cavity 238 and a piston cooling gallery 240 of the piston body 230. In other embodiments, as shown in FIG. 12, the piston lubrication passage 344 extends axially away from the piston cooling gallery 340 relative to the piston axis 342 (and also extends axially away from the piston pooling cavity 338). For example, the piston lubrication passage 344 can extend substantially parallel to the piston axis 342. In some embodiments, as shown in FIG. 11, the piston lubrication passage 244 is one of a plurality of piston lubrication passages 244 that extend from the piston cooling gallery 240 toward the wrist axis A.

Still referring to FIG. 11, the lubrication system also includes a pin journal 268 that defines a journal lubrication aperture 276. In some embodiments, as shown in FIG. 11, the journal lubrication aperture 276 extends at an oblique angle relative to the piston axis 242. For example, the journal lubrication aperture 276 can extend in a substantially radial direction relative to a wrist pin axis A defined by the gudgeon pin. In other embodiments, as shown in FIG. 13, the journal lubrication aperture 476 extends substantially parallel to the piston axis 442.

The location of piston lubrication passage 244 relative to the piston pooling cavity 238, the location of the journal lubrication aperture 276 relative to the piston pooling cavity 238, and/or the location of a journal pooling cavity 280 relative to the journal lubrication aperture 276 can also be different in various embodiments. For example, in the embodiment of FIG. 11, the piston lubrication passage 244 extends from an end of the piston pooling cavity 238 proximate to a circumferential edge 282 of the piston pooling cavity 238. In some embodiments, the piston lubrication passage 244 can be disposed at an opposite end (e.g., an opposite circumferential end relative to the wrist axis A) of the piston pooling cavity 238 as the journal lubrication aperture 276. Such an arrangement can reduce lubricant reversal (e.g., prevent lubricant from flowing back into the piston cooling gallery) and can improve oil retention in the area of the piston and/or journal pooling cavity. In other embodiments, at least one of the piston lubrication passage 244 or the journal lubrication aperture 276 are disposed at an intermediate (e.g., central) position between opposing edges of the piston pooling cavity 238.

Figure 13:
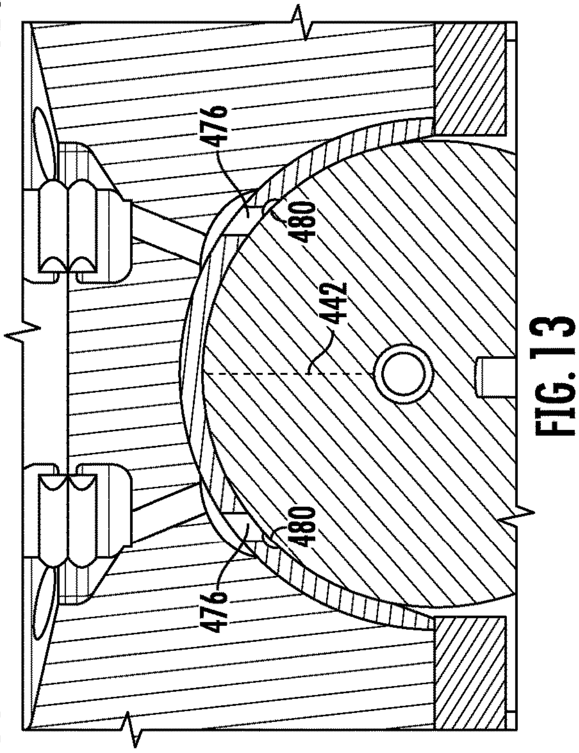
FIG. 13 is a section view of still another lubrication system for the pin joint of the engine piston of FIG. 1, according to some embodiments.

Referring to FIG. 13, the journal pooling cavity 480 can also be offset from or extend from an edge of the journal lubrication aperture 476 so that the journal pooling cavity 480 is disposed on one side of the journal lubrication aperture 476.

The position and/or orientation of the piston lubrication passage, the piston cooling cavity, the journal lubrication aperture, and the journal pooling cavity affect the balance of meeting fatigue margins of the piston, improving back contact pressure on the pin joint bushing/journal, and reducing oil flow reversal to improve pin joint performance. The interaction between these passage geometries can provide different performance benefits under different operating conditions.

Figure 14:
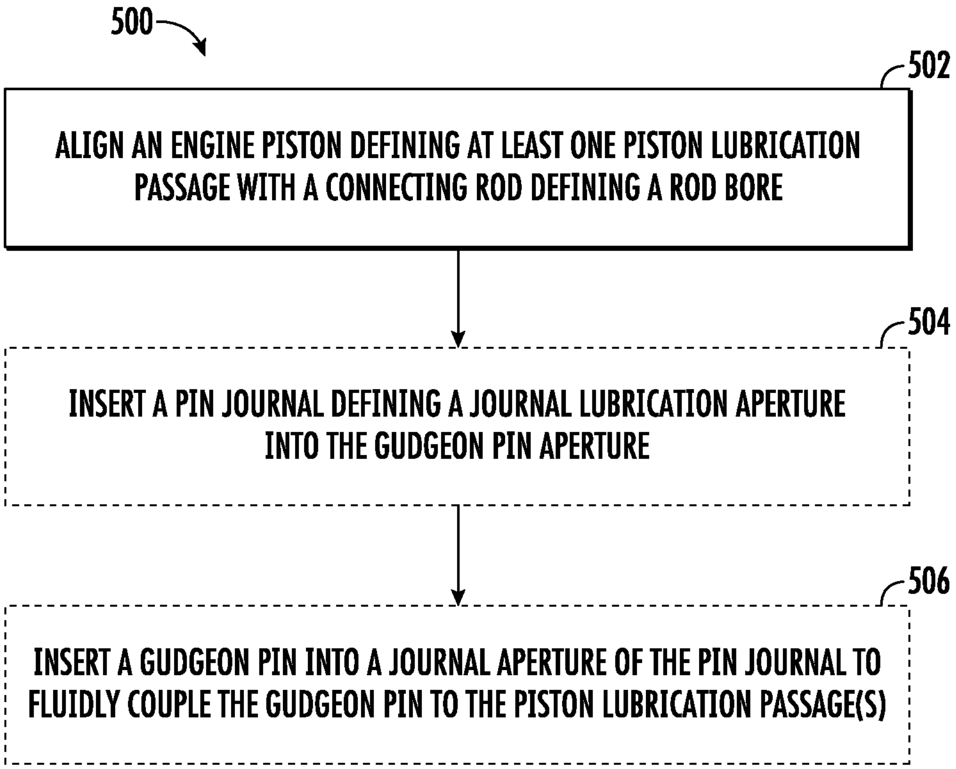
FIG. 14 is a flow diagram of a method of making an engine system, a lubrication system for an engine system, and/or an engine piston thereof, according to some embodiments.

Referring to FIG. 14, a method 500 of making an engine, pin joint lubrication system, and/or engine piston is shown, such as any of the engine, pin joint lubrication systems, and/or engine piston arrangements described with reference to FIGS. 1-13. The method 500 includes coupling an engine piston to a connecting rod so as to fluidly couple the engine piston to the connecting rod.

Operation 502 includes aligning the engine piston defining at least one piston lubrication passage with the connecting rod defining a rod bore by aligning a gudgeon pin aperture of the engine piston with the connecting rod. In some embodiments, operation 502 includes aligning a pin bore of the connecting rod with the gudgeon pin aperture of the engine piston. Operation 502 can include forming the engine piston by forming a piston body defining a gudgeon pin aperture, a piston cooling gallery, and at least one piston lubrication passage extending therebetween. In some embodiments, operation 502 includes forming a piston pooling cavity into the engine piston by forming a channel that extends radially outward from the gudgeon pin aperture.

Operation 504 includes inserting a pin journal defining a journal lubrication aperture into the gudgeon pin aperture. In some embodiments, operation 502 includes providing a pin journal received in a gudgeon pin aperture of an engine piston for a gudgeon pin. In some embodiments, the pin journal includes (e.g., defines) a journal pooling cavity. Operation 504 can include inserting the pin journal into the gudgeon pin aperture along a wrist axis of the gudgeon pin aperture to couple a connecting rod to the engine piston.

Operation 506 includes inserting a gudgeon pin into a journal aperture of the pin journal to support the engine piston on the connecting rod, and to fluidly couple the gudgeon pin to the piston lubrication passage(s). In some embodiments, operation 506 also includes fluidly coupling the gudgeon pin to a rod bore of the connecting rod.

In some embodiments, operation 506 includes forming the gudgeon pin, by forming a feed bore, a pin bore, and at least one primary feed passageway providing fluid flow between the pin bore and an external surface of the gudgeon pin into a pin body of the gudgeon pin. In some embodiment, operation 506 includes forming at least one distribution bore and at least one secondary feed passageway providing fluid flow between the distribution bore(s) and the external surface of the gudgeon pin. In other embodiments, the method 500 includes additional, fewer, and/or different operations.

In some embodiments, the method 500 includes storing, in the journal pooling cavity, lubricant, such as oil. The method further includes establishing a fluid connection between the journal pooling cavity and the gudgeon pin. The method includes storing lubricant in a piston pooling cavity and establishing fluidic communication between the piston pooling cavity and a piston cooling gallery. The method further includes lubricating the engine piston via lubricant stored in the piston pooling cavity.

Figure 15:
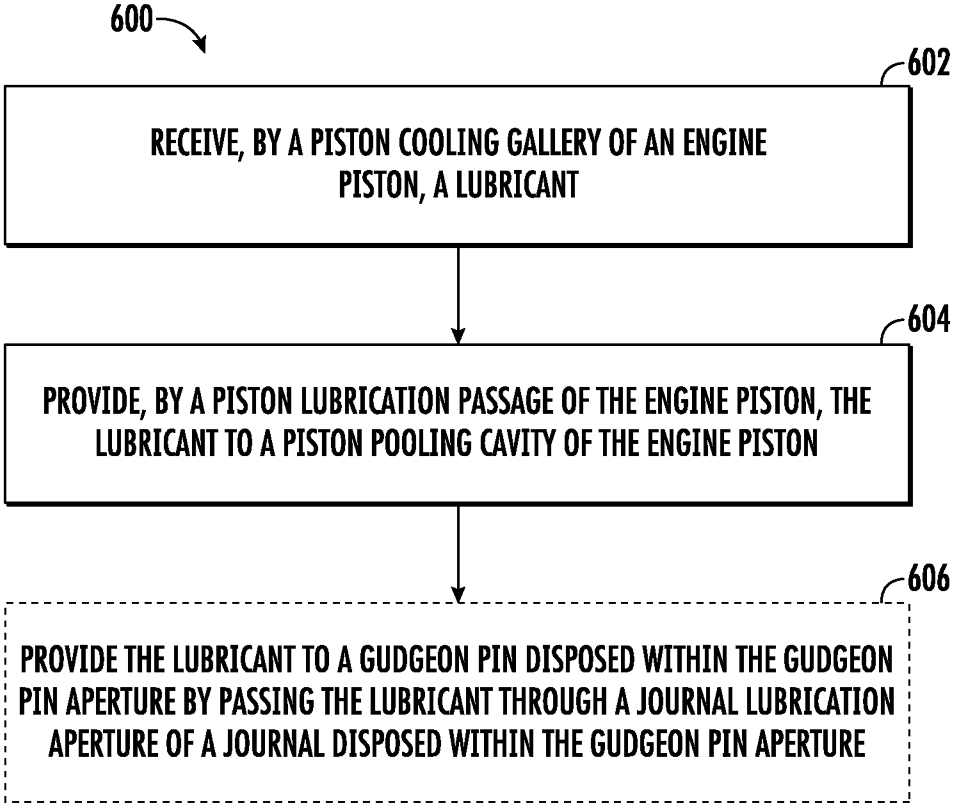
FIG. 15 is a flow diagram of a method of lubricating a pin joint of an engine piston, according to some embodiments.

Referring to FIG. 15, a method 600 of lubricating a pin joint of an engine piston is shown, according to an embodiment. The method 600 can be implemented with any of the engine and/or engine piston arrangements described with reference to FIGS. 1-13. In other embodiments, the method 600 can include additional, fewer, and/or different operations.

Operation 602 includes receiving, by a piston cooling gallery of the engine piston, a lubricant. Operation 604 includes providing, by a piston lubrication passage of the engine piston that extends from the piston cooling gallery, the lubricant to a piston pooling cavity of the engine piston that extends radially away from a gudgeon pin aperture of the engine piston. Operation 606 includes providing the lubricant to a gudgeon pin disposed within the gudgeon pin aperture by passing the lubricant through a journal lubrication aperture of a journal disposed within the gudgeon pin aperture.

In some embodiments, operation 602 includes providing, by a piston cooling nozzle, the lubricant to the piston cooling gallery.

In some embodiments, operation 606 includes distributing the lubricant across a journal pooling cavity in fluid communication with the journal lubrication aperture and extending radially away from a journal aperture that is coaxial with a wrist axis of the gudgeon pin. In some embodiments, operation 606 further includes providing the lubricant to the gudgeon pin through a connecting rod that is coupled to the gudgeon pin by passing the lubricant through a check valve that is positioned in a feed bore of the gudgeon pin or along a rod bore defined by the connecting rod so as to prevent oil reversal through the connecting rod.

In some embodiments, operation 602 includes providing a first lubricant flow to the gudgeon pin from the piston cooling gallery. In such embodiments, operation 606 can include passing a second lubricant flow to the gudgeon pin from the connecting rod.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, or fluidic. For example, circuit A communicably "coupled" to circuit B can signify that the circuit A communicates directly with circuit B (i.e., no intermediary) or communicates indirectly with circuit B (e.g., through one or more intermediaries).

References herein to the positions of elements (e.g., "top," "bottom," "above," "below," "inner," "outer") are merely used to describe the orientation of various elements in the FIGURES. It should be noted that the orientation of various elements can differ according to other exemplary embodiments, and that such variations are intended to be encompassed by the present disclosure.

It is important to note that the construction and arrangement of the lubrication system as shown in the various exemplary embodiments is illustrative only. Additionally, any element disclosed in one embodiment can be incorporated or utilized with any other embodiment disclosed herein. Although only one example of an element from one embodiment that can be incorporated or utilized in another embodiment has been described above, it should be appreciated that other elements of the various embodiments can be incorporated or utilized with any of the other embodiments disclosed herein.

What is claimed is:

1. A lubrication system comprising:
an engine piston comprising:
a piston body defining:
a gudgeon pin aperture;
a piston pooling cavity extending radially outward from the gudgeon pin aperture;
a piston cooling gallery; and
a piston lubrication passage in fluid communication with the piston cooling gallery and the piston pooling cavity;
a pin journal received in the gudgeon pin aperture of the piston body and defining:
a journal aperture in fluid communication with the piston pooling cavity; and
a journal pooling cavity in fluid communication with the journal aperture; and
a gudgeon pin received within the gudgeon pin aperture adjacent the pin journal to provide fluid communication between the journal pooling cavity and the gudgeon pin.

2. The lubrication system of claim 1, further including a piston cooling nozzle configured to provide lubricant to the piston cooling gallery.

3. The lubrication system of claim 1, wherein the piston pooling cavity defines a convex profile in cross-section.

4. The lubrication system of claim 1, wherein the piston pooling cavity extends along a wrist axis defined by the gudgeon pin aperture.

5. The lubrication system of claim 1, wherein the piston body defines a plurality of piston lubrication passages, and the plurality of piston lubrication passages provide fluid communication between the piston cooling gallery and the piston pooling cavity.

6. The lubrication system of claim 5, wherein the piston pooling cavity defines a volume that is larger than a volume defined by the plurality of piston lubrication passages.

7. The lubrication system of claim 1, wherein the gudgeon pin defines a pin bore that is in fluid communication with the journal pooling cavity.

8. The lubrication system of claim 7, further comprising a connecting rod defining a rod bore therethrough, the connecting rod fluidly coupled to the pin bore by a check valve.

9. An engine piston assembly comprising:
a piston body defining:
a gudgeon pin aperture;
a piston pooling cavity extending radially outward from the gudgeon pin aperture and defining a channel that extends parallel to a wrist axis defined by the gudgeon pin aperture;
a piston cooling gallery extending in a circumferential direction about a piston axis of the piston body; and a piston lubrication passage extending between the piston cooling gallery and the piston pooling cavity; and a pin journal received in the gudgeon pin aperture of the piston body and defining:

a journal aperture in fluid communication with the piston pooling cavity; and a journal pooling cavity in fluid communication with the journal aperture.

10. The engine piston assembly of claim 9, wherein the piston lubrication passage extends radially away from the piston pooling cavity.

11. The engine piston assembly of claim 9, wherein the piston lubrication passage extends from an end of the piston pooling cavity proximate to a circumferential edge of the piston pooling cavity.

12. The engine piston assembly of claim 9, wherein the piston lubrication passage extends axially away from the piston cooling gallery relative to the piston axis.

13. The engine piston assembly of claim 9, wherein the piston pooling cavity is a semi-circular groove having a constant radius of curvature that extends between two circumferential positions along the gudgeon pin aperture.

14. The engine piston assembly of claim 9, wherein the piston lubrication passage is one of a plurality of piston lubrication passages that extend from the piston cooling gallery toward the wrist axis.

15. The engine piston assembly of claim 9, wherein the piston pooling cavity is one of a plurality of piston cooling cavities disposed at different circumferential positions along the gudgeon pin aperture.

16. The engine piston assembly of claim 9, wherein the piston pooling cavity is spaced axially apart from opposing axial ends of the gudgeon pin aperture relative to the wrist axis.

17. A method of lubricating a pin joint of an engine piston, the method comprising:

receiving, by a piston cooling gallery of the engine piston, a lubricant;

providing, by a piston lubrication passage of the engine piston that extends from the piston cooling gallery, the lubricant to a piston pooling cavity of the engine piston that extends radially away from a gudgeon pin aperture of the engine piston; and providing the lubricant to a gudgeon pin disposed within the gudgeon pin aperture by passing the lubricant through a journal lubrication aperture of a journal disposed within the gudgeon pin aperture.

18. The method of claim 17, wherein providing the lubricant to the gudgeon pin further comprises distributing the lubricant across a journal pooling cavity in fluid communication with the journal lubrication aperture and extending radially away from a journal aperture that is coaxial with a wrist axis of the gudgeon pin.

19. The method of claim 17, further comprising providing the lubricant to the gudgeon pin through a connecting rod that is coupled to the gudgeon pin by passing the lubricant through a check valve that is positioned in a feed bore of the gudgeon pin.

* * * * *